(12) United States Patent
Gabriel

(10) Patent No.: US 6,604,665 B2
(45) Date of Patent: Aug. 12, 2003

(54) PNEUMATIC NAILER COILED COLLATION STRIP

(75) Inventor: William L. Gabriel, Barrington, IL (US)

(73) Assignee: Illinois Tool Works Inc, Glenview, IL (US)

(*) Notice: Subject to any disclaimer, the term of this patent is extended or adjusted under 35 U.S.C. 154(b) by 52 days.

(21) Appl. No.: 09/961,643

(22) Filed: Sep. 24, 2001

(65) Prior Publication Data

US 2003/0057250 A1 Mar. 27, 2003

(51) Int. Cl.[7] .............................. B25C 1/00; B65D 85/24
(52) U.S. Cl. ........................ 227/120; 227/136; 227/137; 206/347
(58) Field of Search .......................... 227/19, 120, 127, 227/129, 135, 136, 137; 206/347, 485

(56) References Cited

U.S. PATENT DOCUMENTS

| | | | | |
|---|---|---|---|---|
| 3,885,669 A | * | 5/1975 | Potucek | ...................... 206/347 |
| 4,349,106 A | * | 9/1982 | Bogel | .......................... 206/347 |
| 4,606,455 A | * | 8/1986 | Grikis et al. | ................. 227/136 |
| 5,810,239 A | | 9/1998 | Stich | |
| 6,095,393 A | | 8/2000 | Smolinski | |
| 6,152,346 A | | 11/2000 | Laubach | |

* cited by examiner

Primary Examiner—Rinaldi I. Rada
Assistant Examiner—Michelle Lopez
(74) Attorney, Agent, or Firm—Lisa M. Soltis; Mark W. Croll; Donald J. Breh (57) ABSTRACT

A collation strip for use within a nail gun is fabricated from a suitable polypropylene composition and has a relatively large thickness dimension, however, in order to impart enhanced flexibility to the thickened collation strip, the collation strip is provided with a plurality of auxiliary apertures within its spine section, or alternatively within its spine and hinged sections. Such enhanced flexibility permits the collation strip to be utilized under relatively low temperature conditions such that the collation strip will not experience jamming within the nail gun.

26 Claims, 3 Drawing Sheets

PNEUMATIC NAILER COILED COLLATION STRIP

FIELD OF THE INVENTION

The present invention relates generally to pneumatic nail guns or nailers, and more particularly to a new and improved nail coil collation strip which can be utilized under a variety of environmental conditions without causing jamming of the pneumatic nail guns or tools within which such nail coil collation strips are adapted to be used.

BACKGROUND OF THE INVENTION

Pneumatically-operated nail guns, tools, or nailing machines, wherein a driver element is driven by means of compressed air so as to in turn drive a nail into an underlying workpiece or substrate, are of course well known. Such nail guns, tools, or nailing machines are exemplified by means of the nailing machine disclosed within U.S. Pat. No. 5,810,239 which issued to Stich on Sep. 22, 1998. As can be appreciated from FIG. 1, which corresponds to FIG. 1 of the noted patent, the nailing machine comprises a handle portion 1a oriented along an axis Q and by means of which the gun, tool, or machine may be held and manipulated. A magazine 2 is adapted to hold or contain a collated strip of nails 4 wherein the individual nails 5 are mounted within a collation strip 4a by means of their head and upper shank portions. A body member 1 has a pneumatically-driven driver mechanism or component, not shown, disposed therein so as to repetitively impact upon each individual nail 5, as each individual nail 5 is conveyed into the body member 1 of the tool or machine adjacent to the nose portion 3, so as to drive each nail 5 into an underlying workpiece or substrate. The tool or machine further comprises an aimer attachment as disclosed at 6, while a pair of separable nail guides are disclosed at 13.

Figure 2:
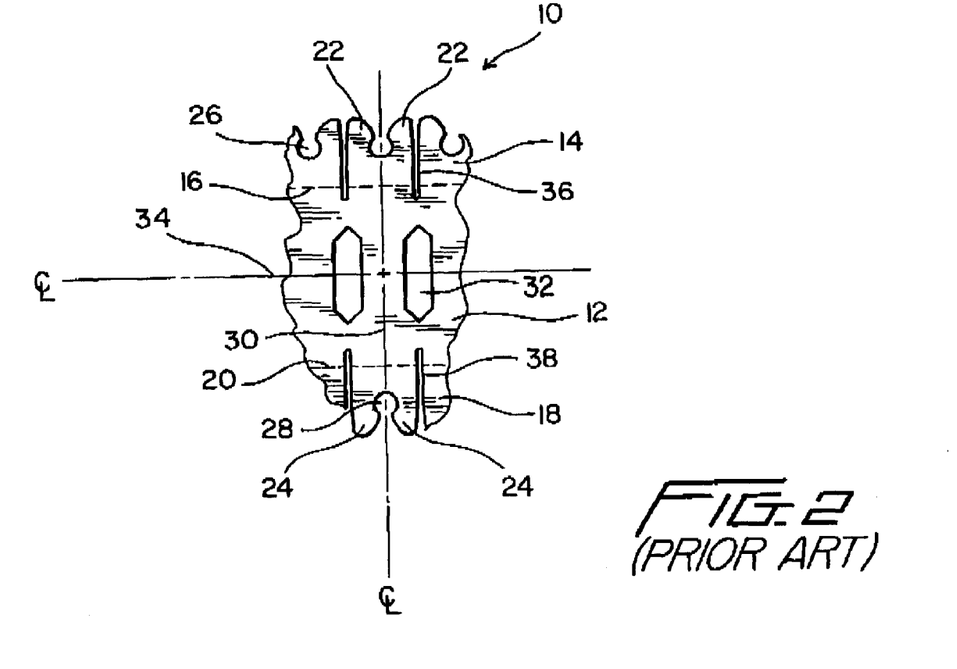
FIG. 2 is a vertical elevational view of a PRIOR ART collation strip showing the collation strip in its flattened state prior to the bending or folding of the upper and lower hinged portions of the collation strip to their horizontal operative positions so as to fabricate the collation strip into its operative form for holding a plurality of nails.
Figure 3:
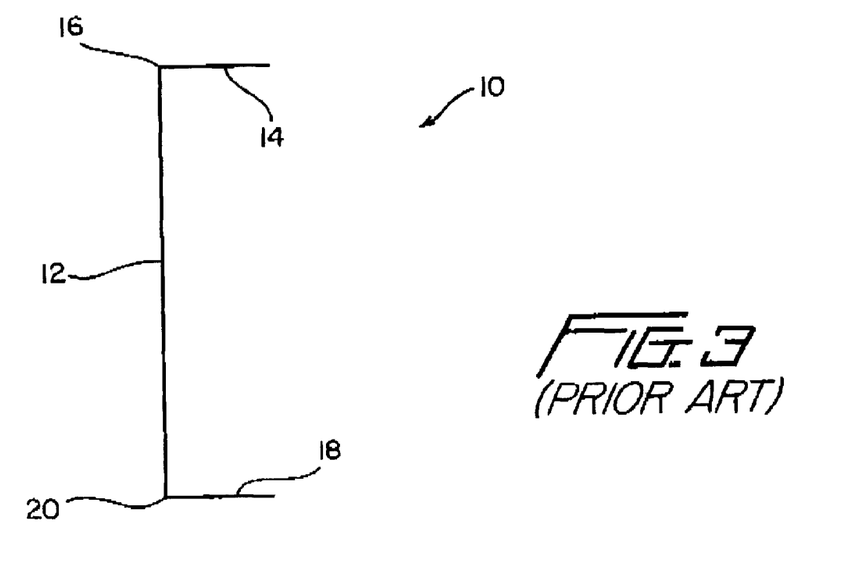
FIG. 3 is a side elevational view of the PRIOR ART collation strip shown in FIG. 2 subsequent to the bending or folding of the upper and lower hinged portions of the collation strip to their operative positions at which they operatively cooperate to hold a plurality of nails.

With reference now being made to FIGS. 2 and 3, another conventional or PRIOR ART collation strip for mounting a plurality of nail-type fasteners therein is disclosed and is generally indicated by the reference character 10. The collation strip 10 has a substantially U-shaped cross-sectional configuration as seen in FIG. 3, is fabricated from a suitable polypropylene composition, and is seen to comprise a vertical spine section 12, and an upper horizontally disposed hinged section 14 which is disposed substantially perpendicular to the vertical spine section 12 when the upper hinged section 14 is folded or bent into its horizontal disposition or orientation about a hinge line 16 integrally interconnecting the hinged section 14 to the spine section 12. In a similar manner, a lower horizontally disposed hinged section 18 is disposed substantially perpendicular to the vertical spine section 12 when the lower hinged section 18 is also folded or bent into its horizontal disposition or orientation about a hinge line 20 integrally interconnecting the hinged section 18 to the spine section 12. Both the upper and lower hinged sections 14,18 of the collation strip 10 are respectively provided with a series of laterally spaced pairs of arms or tabs 22,24 which together define a series of laterally spaced pockets or recesses 26, 28.

The pockets or recesses 26,28 are aligned with each other along centerlines 30 such that when the hinged sections 14,18 are disposed at their folded or bent positions around the hinge lines 16,20 so as to be disposed in their perpendicular orientations with respect to the spine section 12, each one of the pockets or recesses 26 of the hinge section 14 will be coaxially aligned with a respective one of the pockets or recesses 28 of the hinge section 18 such that a shank portion of a nail can be accommodated and retained within such pockets or recesses 26,28 of the hinge sections 14,18. In order to facilitate the feeding or forward movement of the collation strip 10 within a typical pneumatically-operated nail gun, tool, or nailing machine, the collation strip 10 is also provided with a plurality of laterally spaced elongated diamond-shaped holes or apertures 32 which are serially arranged along a centerline 34 within a vertically central portion of the spine section 12. It is lastly noted that each set or pair of arms or tabs 22,24 which cooperate together so as to define the recesses or pockets 26,28 therebetween are separated from each adjacent set or pair of arms or tabs 22,24 by means of a vertical slit 36,38 which facilitates the bending of the hinged sections 14,18 into their horizontal states, as well as the curvature of the collation strip 10 when the same is formed into a coiled structure for incorporation within the magazine 2 of a pneumatically-operated nail gun, tool, or nailing machine 1 such as that shown in FIG. 1.

Normally, or at least very often, such conventional pneumatically-operated nail guns, tools, or nailing machines are operated within an enclosed environment, that is, within a residence, a commercial or industrial building, and the like. However, it has recently become more prevalent to use such nail guns, tools, or nailing machines upon, for example, job sites which are open to the atmosphere and are therefore exposed to the local weather conditions and the local environment. More particularly, that means that the nail guns, tools, and nailing machines are exposed to, and are being operated under, substantially extreme temperature conditions. More specifically, if such nail guns, tools, and nailing machines were being employed, for example, during the summer months within the southwestern part of the United States, they might very easily or readily be required to be operated in an environment wherein the prevailing or ambient temperature was approximately 140° F. or higher. For example, the job site could comprise a commercial or industrial building roof, black in color, where as a result of impinging solar radiation, the ambient temperature can attain levels which are substantially higher than normal ambient temperatures officially recorded by the National Weather Service. Still further, the nail guns, tools, or nailing machines are often used at remote sites as a result of which the nail guns, tools, or nailing machines often experience jostling or vibrational forces which may adversely affect the proper retention of the nails within the collation strips. In a similar but opposite manner or sense, if such nail guns, tools, and nailing machines were being employed, for example, during the winter months within the northern part of the United States, they might very easily or readily be required to be operated in an environment wherein the prevailing temperature was approximately 20° F. or lower. It therefore becomes somewhat difficult to fabricate a collation strip for such pneumatically-operated nail guns, tools, and nailing machines which is capable of operating under such widely varying environmental and temperature conditions.

More particularly, the collation strip 10 is fabricated from a particular or suitable polypropylene composition, and when the collation strip 10 is employed within relatively high-temperature environmental conditions, it has been experienced that the collation strip becomes very flexible whereby the nail fasteners experience or undergo slippage and are no longer able to be properly secured, held, or retained within the aforenoted recesses or pockets 26,28 with the proper degree of slip resistance. Accordingly, several different modifications have been implemented in connection with the fabrication of the collation strip 10 in an attempt to overcome or rectify the noted operational deficiencies, however, such modifications did not in fact resolve the problems or difficulties under all environmental conditions. For example, in connection with the manufacture of the collation strip 10, a thicker collation strip 10 was in fact fabricated in order to render the same less flexible when being used within the higher temperature ranges, and this structure in fact resolved the nail slippage and retention problems characteristic of the collation strip 10 when being used within a nail gun, tool, or nailing machine under such elevated temperature conditions, however, additional operational problems or difficulties occurred in connection with such a collation strip 10 when the same was being used within a nail gun, tool, or nailing machine under substantially low temperature conditions.

More particularly, when such a collation strip 10 would be used within a nail gun, tool, or nailing machine when the atmospheric temperature conditions are within the range of, for example, 20–40° F., the relatively thickened collation strip 10 became so stiff that there wasn't sufficient flexibility which would permit the collation strip 10 to properly feed the nails to their nosepiece-firing positions within the gun, tool, or machine. In particular, as has been noted in connection with the collation strip 4 of nails 5 as disclosed within U.S. Pat. No. 5,810,239, the collation strip 4 of nails 5 is formed into a coiled structure which is housed within the magazine 2. Accordingly, when the relatively thickened collation strip of nails is disposed in its coiled format within a nail gun magazine, and the plurality of nails are adapted to be serially fed to the nail gun nosepiece-firing position, the coiled collation strip tends to retain its coiled shape or configuration whereby the collation strip cannot be effectively uncoiled so as to properly feed the nails to the nosepiece firing position. In addition, the pockets or recesses of the hinged portions are also not flexible enough to effectively release the shank portions of the nails. Accordingly, the nail gun, tool, or nailing machine experiences jamming for several different operative reasons.

In light of the foregoing, a need exists in the art for a new and improved nail collation strip which can be utilized within nail guns, tools, or nailing machines under extremely diverse temperature conditions whereby the nail collation strip will be capable of exhibiting a sufficient amount or degree of stiffness such that the collated nails are not undesirably or prematurely released from or permitted to undergo slippage with respect to collation strip, and yet nevertheless, the collation strip will exhibit a sufficient amount of flexibility so as to enable the collation strip to effectively undergo uncoiling from its originally or initially coiled state within the nail gun, tool, or nailing machine magazine, as well as enabling the release of the nails from their recesses or pockets, and thereby be capable of readily feeding the nails in a serial manner into the nosepiece firing position of the nail gun, tool, or nailing machine so as to effectively prevent the occurrence of any jamming from occurring within the nail gun, tool, or nailing machine. In this manner, a single collation strip of collated nails could be used under diverse temperature conditions as opposed to requiring the selective use of different collation strips of nails in accordance with temperature-dependent characteristics in order to ensure that the collation strips will be operative or functional without experiencing release or slippage of the nails from the collation strips under elevated temperature conditions, or without experiencing jamming of the collation strip within the gun, tool, or machine under lower temperature conditions.

OBJECTS OF THE INVENTION

Accordingly, it is an object of the present invention to provide a new and improved collation strip of nails, and a nail gun, tool, or nailing machine having such a new and improved collation strip of nails incorporated therein.

Another object of the present invention is to provide a new and improved collation strip of nails, and a nail gun, tool, or nailing machine having such a new and improved collation strip of nails incorporated therein, wherein the various operative difficulties and deficiencies characteristic of PRIOR ART collation strips, and nail guns, tools, or machines having such collation strips incorporated therein, are effectively overcome and resolved.

An additional object of the present invention is to provide a new and improved collation strip of nails, and a nail gun, tool, or nailing machine having such a new and improved collation strips incorporated therein, wherein the collation strips are capable of being used under a diverse range of temperature conditions.

A further object of the present invention is to provide a new and improved collation strip of nails, and a nail gun, tool, or nailing machine having such a new and improved collation strip of nails incorporated therein, wherein the collation strips are capable of being used under a diverse range of temperature conditions so that regardless of the particular ambient temperature conditions of the geographical region within which, for example, a nail gun, tool, or nailing machine having such new and improved collation strip of nails incorporated therein is being used, the collation strip will exhibit a proper amount or requisite degree of both stiffness and flexibility.

A last object of the present invention is to provide a new and improved collation strip of nails, and a nail gun, tool, or nailing machine having such a new and improved collation strip of nails incorporated therein, wherein the collation strips are capable of being used under a diverse range of temperature conditions so that regardless of the particular ambient temperature conditions of the geographical region within which, for example, a nail gun, tool, or nailing machine having such new and improved collation strip of nails incorporated therein is being used, the collation strip will exhibit a proper amount or requisite degree of both stiffness and flexibility whereby even under relatively high temperature conditions, the collation strip will in fact retain the collated nails therein and thereby prevent slippage and premature release of the nails from the collation strip, and conversely, under relatively low temperature conditions, the collation strip will nevertheless be sufficiently flexible as to be capable of conveying the collated nails to the nosepiece firing position, and the release of the nails from the pockets or recesses defined within the collation strip, without causing jamming of the nail gun, tool, or nailing machine.

SUMMARY OF THE INVENTION

The foregoing and other objectives are achieved in accordance with the teachings and principles of the present invention through the provision of a new and improved nail collation strip, and a nail gun, tool, or nailing machine having the new and improved nail collation strip incorporated therein, which comprises, in accordance with a first embodiment of the present invention, the fabrication of a collation strip which has a thickness dimension which is approximately 30% thicker than a conventionally used collation strip. In addition, a plurality of apertures, which are provided in addition to the apertures already provided therein for achieving the actual conveyancing or forward movement of the collation strip within the nail gun, tool, or nailing machine and which may have any one of a plurality of geometrical configurations, are provided within the spine section of the collation strip. The enhanced thickness dimensioning of the collation strip provides the strip with enhanced stiffness properties so as to be capable of retaining the nails therewithin under relatively high temperature levels, however, the provision of the plurality of supplemental apertures within the spine section of the collation strip provides the spine section of the collation strip with the desired or requisite amount of flexibility so as to enable the collation strip to be uncoiled from its coiled state within the gun, tool, or machine magazine and thereby be additionally capable of serially feeding the nails to the nosepiece firing position without causing any jamming of the nail gun, tool, or nailing machine.

In accordance with a second embodiment of the present invention, the aforenoted supplemental apertures overlap the hinge lines defined between the spine and hinged sections of the collation strip so as to provide the tab portions of the collation strip, which define the recesses or pockets within which the nail shank portions are disposed, with enhanced flexibility characteristics or properties. Therefore, in addition to the aforenoted enhancement in the flexibility of the spine section of the collation strip so as to enable the collation strip to be uncoiled from its coiled state within the nail gun, tool, or nailing machine magazine, and thereby be capable of serially feeding the nails to the nosepiece firing position such that the nail gun, tool, or nailing machine does not experience any jamming, enhanced flexibility is also imparted to the tab portions of the collation strip so as to facilitate release of the nail shank portions from the recesses or pocket regions of the collation strip.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 4:
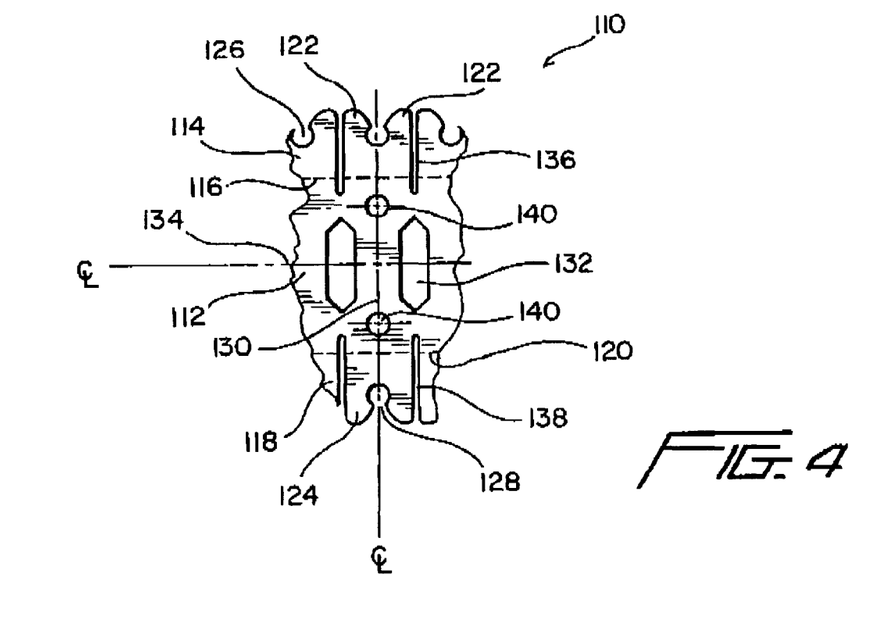
FIG. 4 is a first embodiment of a new and improved collation strip, constructed in accordance with the teachings and principles of the present invention so as to provide the collation strip with enhanced flexibility characteristics, wherein the collation strip is adapted to hold a plurality of nails in a coiled collated form for use within a magazine of a nail gun, tool, or nailing machine.

Referring now to the drawings, and more particularly to FIG. 4 thereof, a first embodiment of a new and improved collation strip, for mounting a plurality of nail-type fasteners therein and constructed in accordance with the principles and teachings of the present invention, is disclosed and is generally indicated by the reference character 110. It is to be initially noted that in light of the fact that the various structural features or components of the new and improved collation strip 110 are similar to those of the PRIOR ART collation strip 10 as disclosed in FIG. 2, the various structural features or components of the new and improved collation strip 110 will therefore be designated by reference characters which are similar to those used in connection with the PRIOR ART collation strip 10 except that the reference characters for the new and improved collation strip 110 will be within the 100 series.

More particularly then, it is seen that the new and improved collation strip 110 is fabricated from a suitable polypropylene composition and is adapted to have a substantially U-shaped cross-sectional configuration similar to that of the PRIOR ART collation strip 10 as seen in FIG. 3. Accordingly, the new and improved collation strip 110 is seen to comprise a vertical spine section 112, and an upper hinged section 114 which will be horizontally disposed and substantially perpendicular with respect to the vertical spine section 112 when the upper hinged section 114 is in fact folded or bent into its horizontal disposition or orientation about a hinge line 116 integrally interconnecting the hinged section 114 to the spine section 112. In a similar manner, a lower hinged section 118 will be horizontally disposed and substantially perpendicular with respect to the vertical spine section 112 when the lower hinged section 118 is in fact folded or bent into its horizontal disposition or orientation about a hinge line 120 integrally interconnecting the hinged section 118 to the spine section 112. Both the upper and lower hinged sections 114,118 of the collation strip 110 are respectively provided with a series of laterally spaced pairs of arms or tabs 122,124 which together define a series of laterally spaced pockets or recesses 126, 128.

The pockets or recesses 126,128 are aligned with each other along centerlines 130 such that when the hinged sections 114,118 are disposed at their folded or bent positions around their respective hinge lines 116,120 so as to be disposed in their perpendicular orientations with respect to the spine section 112, each one of the pockets or recesses 126 of the hinge section 114 will be coaxially aligned with a respective one of the pockets or recesses 128 of the hinge section 118 such that a shank portion of a nail can be accommodated and retained within such recesses 126,128 of the hinge sections 114,118. In order to facilitate the feeding or forward movement of the collation strip 110 within a typical pneumatically-operated nail gun, tool, or nailing ma-chine, the collation strip 110 is also provided with a plurality of laterally spaced elongated diamond-shaped holes or apertures 132 which are serially arranged along a centerline 134 within a vertically central portion of the spine section 112. It is lastly noted that each set or pair of arms or tabs 122,124 which cooperate together so as to define the recesses or pockets 126,128 therebetween are separated from each adjacent set or pair of arms or tabs 122,124 by means of a vertical slit 136,138 which facilitates the bending of the hinged sections 114,118 into their horizontal states, as well as the curvature of the collation strip 110 when the same is formed into a coiled structure for incorpoation within the magazine 2 of a pneumatically-operated nail gun, tool, or nailing machine 1 such as that shown in FIG. 1.

Figure 1:
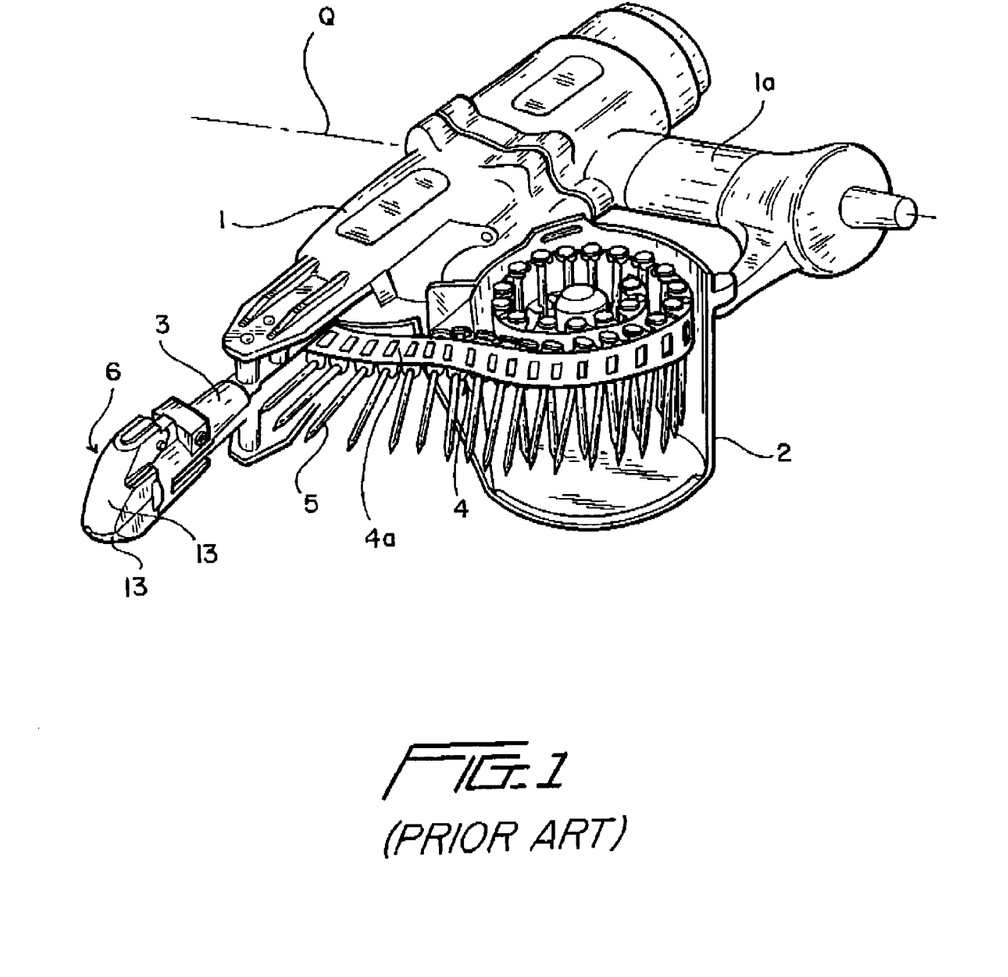
FIG. 1 is a perspective view of a PRIOR ART nail gun or nailing machine showing the incorporation therein of a coiled collation strip of nails as disposed within a tool magazine such that the nails can be serially delivered to the nosepiece portion of the tool or nail gun.

As has been noted hereinbefore, pneumatically-operated nail guns, tools, or nailing machines, such as the nailing machine 1 disclosed within FIG. 1, have often been operated within an enclosed environment, that is, within a residence, a commercial or industrial building, and the like. However, it has recently become more prevalent to use such nail guns, tools, or nailing machines upon, for example, job sites which are open to the atmosphere and are therefore exposed to local weather and local environmental conditions. More particularly, that means that the nail guns, tools, and nailing machines are exposed to, and are being operated under, substantially extreme temperature conditions. More specifically, if such nail guns, tools, and nailing machines were being employed, for example, during the summer months within the southwestern part of the United States, they might very easily or readily be required to be operated in an environment wherein the prevailing or ambient temperature was approximately 140° F. or higher. For example, the job site could comprise the roof of a commercial or industrial building, whereby as a result of the impinging solar radiation upon the roof, which may be black in color, the ambient temperature can attain levels which are substantially higher than normal ambient temperatures officially recorded or reported by the National Weather Service. Still further, the nail guns, tools, or nailing machines are often used at remote sites as a result of which the nail guns, tools, or nailing machines often experience jostling or vibrational forces which may adversely affect the proper retention of the nails within the collation strips. In a similar but opposite manner or sense, if such nail guns, tools, and nailing machines were being employed, for example, during the winter months within the northern part of the United States, then the nail guns, tools, or nailing machines might very easily or readily be required to be operated in an environment wherein the prevailing temperature might be approximately 20° F. or less. It has therefore been somewhat difficult to fabricate a collation strip for such pneumatically operated nail guns, tools, and nailing machines which are capable of operating under such widely varying or diverse environmental and temperature conditions.

More particularly, PRIOR ART collation strips, such as, for example, the collation strip 10 as disclosed within FIG. 1, are fabricated from a particular or suitable polypropylene composition, and when the collation strip 10 is employed within relatively high-temperature environmental conditions, it has been experienced that the collation strip becomes very flexible whereby the nail fasteners experience or undergo slippage and are no longer able to be properly secured, held, or retained within the aforenoted recesses or pockets 26,28 of the collation strip 10 with the proper degree of slip resistance. Accordingly, several different modifications have been implemented in connection with the fabrication of the collation strip 10 in an attempt to overcome or rectify the noted operational deficiencies, however, such modifications have not in fact resolved the problems or difficulties under all environmental conditions.

For example, in connection with the manufacture of the collation strip 10, a thicker collation strip 10 was in fact deemed necessary in order to render the same less flexible when being used within the higher temperature ranges, and this structure in fact resolved the nail slippage and retention problems characteristic of the collation strip 10 when being used within a nail gun, tool, or nailing machine under such elevated temperature conditions, however, additional operational problems or difficulties occurred in connection with such a collation strip 10 when the same was being used within a nail gun, tool, or nailing machine under substantially low temperature conditions. More specifically, when such a collation strip 10 would be used within a nail gun, tool, or nailing machine when the atmospheric temperature conditions are within the range of, for example, 20–40° F., the relatively thickened collation strip 10 would become so stiff that there wasn't sufficient flexibility which would permit the collation strip 10 to properly feed the nails to the nosepiece-firing positions within the gun, tool, or machine. In particular, as has been noted in connection with the collation strip 4 of nails 5 as disclosed within U.S. Pat. No. 5,810,239, the collation strip 4 of nails 5 is formed into a coiled structure which is housed within the magazine 2. Accordingly, when the relatively thickened collation strip of nails 10 is disposed in its coiled format within a nail gun magazine, and the plurality of nails are adapted to be serially fed to the nail gun nosepiece-firing position, the coiled collation strip 10 tends to retain its coiled shape or configuration whereby the collation strip 10 cannot effectively be uncoiled so as to properly feed the nails to the nosepiece-firing position. In addition, the pockets or recesses of the hinged portions are also not flexible enough to effectively release the shank portions of the nails. Accordingly, the nail gun, tool, or nailing machine experiences jamming for any one of the aforenoted several different operative reasons.

In accordance, therefore, with the principles and teachings of the present invention, the collation strip 110 is fabricated so as to exhibit several improvements with respect to conventional or PRIOR ART collation strips. More particularly, the new and improved collation strip 110 of the present invention is fabricated from a suitable polypropylene composition, and in addition, the thickness dimension of the collation strip 110 has been increased relative to the thickness dimension of a conventional PRIOR ART collation strip. For example, the conventional collation strip 10 usually has a thickness dimension which is within the range of 0.031–0.035 inches, with a preferential thickness dimension of 0.034 inches, whereas the new and improved collation strip 110 constructed in accordance with the principles and teachings of the present invention will have a thickness dimension which is within the range of 0.042–0.045 inches. It can therefore be appreciated that in accordance with the fabrication techniques characteristic of the present invention, the thickness dimension of the collation strip 110 is approximately one-third or thirty-three percent (33%) greater than the thickness dimension of the conventional or PRIOR ART collation strip 10.

As has been noted hereinbefore, however, when the collation strip has an increased thickness dimension, the collation strip will exhibit increased stiffness properties which presents operational feeding difficulties or jamming problems for the collation strip within the nail gun, tool, or nailing machine under temperature conditions of, for example, within the range of 20–40° F. Therefore, in order to effectively counteract the tendency of the collation strip to exhibit such increased stiffness properties, the collation strip 110 of the present invention has been provided with a plurality of auxiliary or supplemental apertures 140 wherein the supplemental or auxiliary apertures 140 are disposed in a co-linear manner with respect to each other along the centerlines 130 along which the recesses or pockets 126, 128 are defined. In particular, the provision and presence of the auxiliary or supplemental apertures 140 within the spine section 112 of the collation strip 110, in addition to the disposition or provision of the diamond-shaped apertures 132 within the spine section 112 of the collation strip 110, wherein the apertures 132 are used to accomplish the feeding of the collation strip 110 in a well-known conventional manner, effectively provides the collation strip 110 with enhanced flexibility. While only one set of apertures 140 is illustrated in FIG. 4, it is of course to be understood that a pair or set of apertures 140 can be provided along one or more of the centerlines 130 along which the recesses or pockets 126,128 are disposed. In particular, the number of sets of apertures 140 that are provided within the spine section 112 of the collation strip 110 can be predetermined or varied so as to in effect "fine-tune" the degree of flexibility or stiffness that is desired to be present within the collation strip 110.

In addition, it is also to be noted that while the apertures 140 are disclosed as being of circular configuration with a diametrical extent of, for example, 0.140 inches, the apertures 140 may optionally be provided with alternative geometrical configurations. Still further, while the distance defined between the center of each aperture 140 from the centerline 134 may be on the order of five-sixteenths of an inch ($5/16$ inch), with a center-to-center distance defined between co-linear apertures 140 being on the order of five-eighths of an inch ($5/8$ inch), such distance dimensions may also be altered as desired. Accordingly, as a result of providing such auxiliary or supplemental apertures 140 within the spine section 112 of the collation strip 110, the collation strip 110 has in fact been found to be operative within nail guns, tools, or nailing machines without causing any jamming or the like within such guns, tools, or machines due to the fact that the apertures 140 provide the collation strip 110 with the necessary flexibility, even when the guns, tools, or machines are used under atmospheric temperature conditions of, for example, 20° F. or less.

Figure 5:
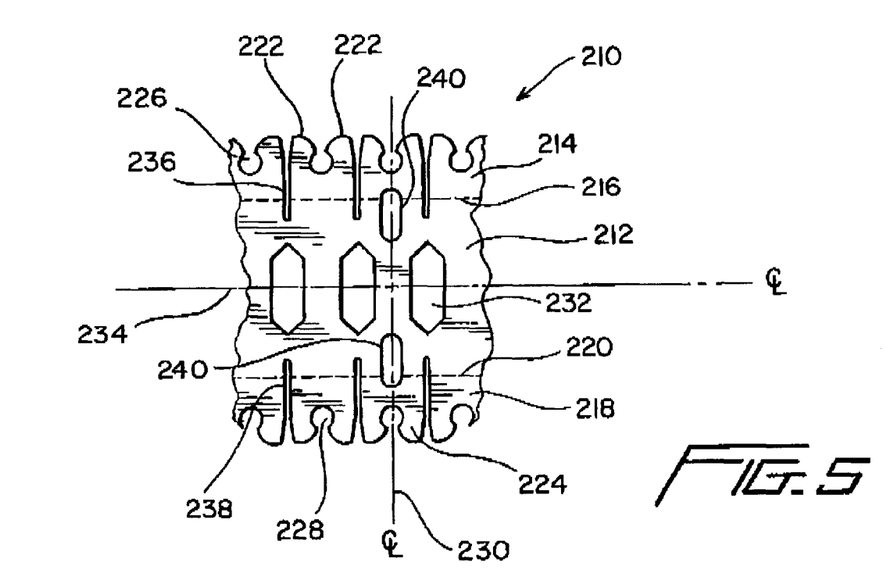
FIG. 5 is a second embodiment of a new and improved collation strip, constructed in accordance with the teachings and principles of the present invention so as to provide the collation strip with enhanced flexibility characteristics, wherein the collation strip is adapted to hold a plurality of nails in a coiled collated form for use within a magazine of a nail gun, tool, or nailing machine.

Referring now lastly to FIG. 5, a second embodiment of a new and improved collation strip, for likewise mounting a plurality of nail-type fasteners therein and constructed in accordance with the principles and teachings of the present invention, is disclosed and is generally indicated by the reference character 210. It is to be initially noted that in light of the fact that the various structural features or components of the second embodiment of the new and improved collation strip 210 are similar to those of the first embodiment collation strip 110 as disclosed within FIG. 4, a detailed description of the second embodiment collation strip 210 will be omitted for brevity purposes, and the description will only be directed toward those features which vary or are different from those of the first embodiment collation strip 110. In light of such similarities, it is also noted that the various structural features or components of the new and improved collation strip 210 which correspond to those of the first embodiment collation strip 110 will be designated by reference characters which are similar to those used in connection with the collation strip 110 except that the reference characters for the new and improved collation strip 210 will be within the 200 series. More particularly then, with reference being made to FIG. 5, it is seen that, in accordance with the principles and teachings concerning the second embodiment collation strip 210 of the present invention, the only significant difference between the first and second embodiments of the present invention as disclosed within FIGS. 4 and 5 resides in the fact that in lieu of the circular apertures 140 of the first embodiment illustrated within FIG. 4, the second embodiment illustrated within FIG. 5 not only comprises a plurality of elongated apertures 240 which are defined or disposed along the centerlines 230 upon which the recesses or pockets 226,228 are co-linearly disposed, but more importantly, the elongated apertures 240 are disposed along the centerlines 230 so as to effectively cross over the hinge lines 216,220 and respectively overlap both the central spine section 212 and the hinge sections 214,218. The apertures 240 may be, for example, one-quarter inch (0.25") long, three thirty-seconds of an inch ($3/32$") wide, and the distance of the lower end portion of the upper one of the apertures 240, as well as the distance of the upper end portion of the lower one of the apertures 240, are each one-quarter of an inch (0.25") from the centerline 234 such that the distance between such end portions of the apertures 240 is one-half of an inch (0.50"). In this manner, as a result of the elongated apertures 240 extending partially into the hinge sections 214,218, enhanced flexibility is not only imparted to the spine section 212, but in addition, such enhanced flexibility is also imparted to the hinge sections 214,218. It is therefore to be additionally emphasized that such enhanced flexibility enables the collation strip 210 to have a requisite amount of flexibility when the nail gun, tool, or nailing machine is being operated under relative low temperature conditions.

Thus, it may be seen and appreciated that in accordance with the principles and teachings of the present invention, a new and improved nail collation strip has been constructed so as to be useable within or under a diverse range of ambient temperature and workplace or job site conditions. More particularly, in order to, for example, enable the collation strip to properly secure and retain the nails therein under relatively high temperature conditions which would ordinarily render the collation strip overly or unduly flexible, the collation strip has been made so as to have a thickness dimension which is substantially greater than the thickness dimension of conventional PRIOR ART collation strips whereby the resulting collation strip exhibits somewhat diminished flexibility under such high temperature conditions. On the other hand, in order to impart a requisite amount of flexibility to the relatively thickened collation strip, particularly under relatively low temperature operating conditions, auxiliary or supplemental apertures are provided within the spine and hinge sections of the collation strip whereby the result collation strip has a sufficient amount of flexibility so as not to present feeding and jamming problems within conventional nail guns, tools, or nailing machines.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A nail gun having a magazine incorporated therein, and a collation strip of nails adapted to be housed within said magazine of said nail gun for serially feeding a plurality of nails to a nail-driving location defined within said nail gun, wherein said collation strip comprises:

a spine section having a predetermined thickness dimension and a longitudinal extent;

a first hinge section hingedly connected to a first end portion of said spine section and having a first set of pockets defined therein along said longitudinal extent;

a first set of longitudinally spaced slits defined within said first hinge section for separating said first hinge section into individual first hinge portions within which said first set of pockets are respectively disposed;

a second hinge section hingedly connected to a second end portion of said spine section and having a second set of pockets defined therein along said longitudinal extent;

a second set of longitudinally spaced slits defined within said second hinge section for separating said second hinge section into individual second hinge portions within which said second set of pockets are respectively disposed, individual ones of said first and second pockets of said individual first and second hinge portions being substantially co-linearly aligned with respect to each other so as to cooperate together in housing individual shank portions of said plurality of nails to be held within said collation strip;

a plurality of apertures defined within said spine section of said collation strip for facilitating feeding of said collation strip within said nail gun; and a plurality of auxiliary apertures, separate and distinct from said first and second sets of longitudinally spaced slits, defined within said spine section of said collation strip so as to provide enhanced flexibility to said spine section of said collation strip.

2. The nail gun as set forth in claim 1, wherein:
said collation strip is fabricated from a polypropylene composition.

3. The nail gun as set forth within claim 1, wherein:
said thickness dimension of said spine section of said collation strip is within the range of 0.042–0.045 inches.

4. The nail gun as set forth within claim 1, wherein:
said auxiliary apertures have predetermined geometrical configurations.

5. The nail gun as set forth in claim 4, wherein:
said auxiliary apertures have circular configurations.

6. The nail gun as set forth in claim 5, wherein:
said circular auxiliary apertures have diametrical extents of 0.140 inches.

7. The nail gun as set forth in claim 5, wherein:
said auxiliary apertures comprises a pair of apertures located upon each one of linear loci interconnecting said substantially co-linearly aligned pockets defined within said first and second hinged sections of said collation strip.

8. The nail gun as set forth in claim 7, wherein:
the center-to-center distance defined between said pair of circular auxiliary apertures is on the order of five-eighths of an inch (⅝ inch).

9. The nail gun as set forth in claim 1, wherein:
said first and second hinged sections are respectively hingedly connected to said spine section by first and second hinge lines; and
said auxiliary apertures cross said first and second hinge lines so as to extend from said spine section of said collation strip into both of said first and second hinged sections of said collation strip so as to likewise provide said hinged sections of said collation strip with enhanced flexibility.

10. The nail gun as set forth in claim 9, wherein:
said auxiliary apertures have substantially elongated configurations.

11. The nail gun as set forth in claim 10, wherein:
each one of said substantially elongated apertures has a length dimension of one-quarter inch (0.25") and a width dimension of three thirty-seconds of an inch (3/32").

12. The nail gun as set forth in claim 9, wherein:
said auxiliary apertures comprises a pair of apertures located upon each one of linear loci interconnecting said substantially co-linearly aligned pockets defined within said first and second hinged sections of said collation strip.

13. The nail gun as set forth in claim 12, wherein:
the distance defined between end portions of said pair of auxiliary apertures is on the order of one-half of an inch (0.50").

14. A collation strip for holding a plurality of nails within a nail gun, comprising:

a spine section having a predetermined thickness dimension and a longitudinal extent;

a first hinge section hingedly connected to a first end portion of said spine section and having a first set of pockets defined therein along said longitudinal extent;

a first set of longitudinally spaced slits defined within said first hinge section for separating said first hinge section into individual first hinge portions within which said first set of pockets are respectively disposed; p1 a second hinge section hingedly connected to a second end portion of said spine section and having a second set of pockets defined therein along said longitudinal extent;

a second set of longitudinally spaced slits defined within said second hinge section for separating said second hinge section into individual second hinge portions within which said second set of pockets are respectively disposed, individual ones of said first and second pockets of said individual first and second hinge portions being substantially co-linearly aligned with respect to each other so as to cooperate together in housing individual shank portions of said plurality of nails to be held within said collation strip;

a plurality of apertures defined within said spine section of said collation strip for facilitating feeding of said collation strip within a nail gun; and a plurality of auxiliary apertures, separate and distinct from said first and second sets of longitudinally spaced slits, defined within said spine section of said collation strip so as to provide enhanced flexibility to said spine section of said collation strip.

15. The collation strip as set forth in claim 14, wherein:
said collation strip is fabricated from a polypropylene composition.

16. The collation strip as set forth within claim 14, wherein:
said thickness dimension of said spine section of said collation strip is within the range of 0.042–0.045 inches.

17. The collation strip as set forth within claim 14, wherein:
said auxiliary apertures have predetermined geometrical configurations.

18. The collation strip as set forth in claim 17, wherein:
said auxiliary apertures have circular configurations.

19. The collation strip as set forth in claim 18, wherein:
said circular auxiliary apertures have diametrical extents of 0.140 inches.

20. The collation strip as set forth in claim 18, wherein:
said auxiliary apertures comprises a pair of apertures located upon each one of linear loci interconnecting said substantially co-linearly aligned pockets defined within said first and second hinged sections of said collation strip.

21. The collation strip as set forth in claim 20, wherein:

the center-to-center distance defined between said pair of circular auxiliary apertures is on the order of five-eighths of an inch (⅝ inch).

22. The collation strip as set forth in claim 14, wherein:

said first and second hinged sections are respectively hingedly connected to said spine section by first and second hinge lines; and said auxiliary apertures cross said first and second hinge lines so as to extend from said spine section of said collation strip into both of said first and second hinged sections of said collation strip so as to likewise provide said hinged sections of said collation strip with enhanced flexibility.

23. The collation strip as set forth in claim 22, wherein:

said auxiliary apertures have substantially elongated configurations.

24. The collation strip as set forth in claim 23, wherein:

each one of said substantially elongated apertures has a length dimension of one-quarter inch (0.25") and a width dimension of three thirty-seconds of an inch (3/32").

25. The collation strip as set forth in claim 22, wherein:

said auxiliary apertures comprises a pair of apertures located upon each one of linear loci interconnecting said substantially co-linearly aligned pockets defined within said first and second hinged sections of said collation strip.

26. The collation strip as set forth in claim 25, wherein:

the distance defined between end portions of said pair of auxiliary apertures is on the order of one-half of an inch (0.50").

* * * * *